UNITED STATES PATENT OFFICE.

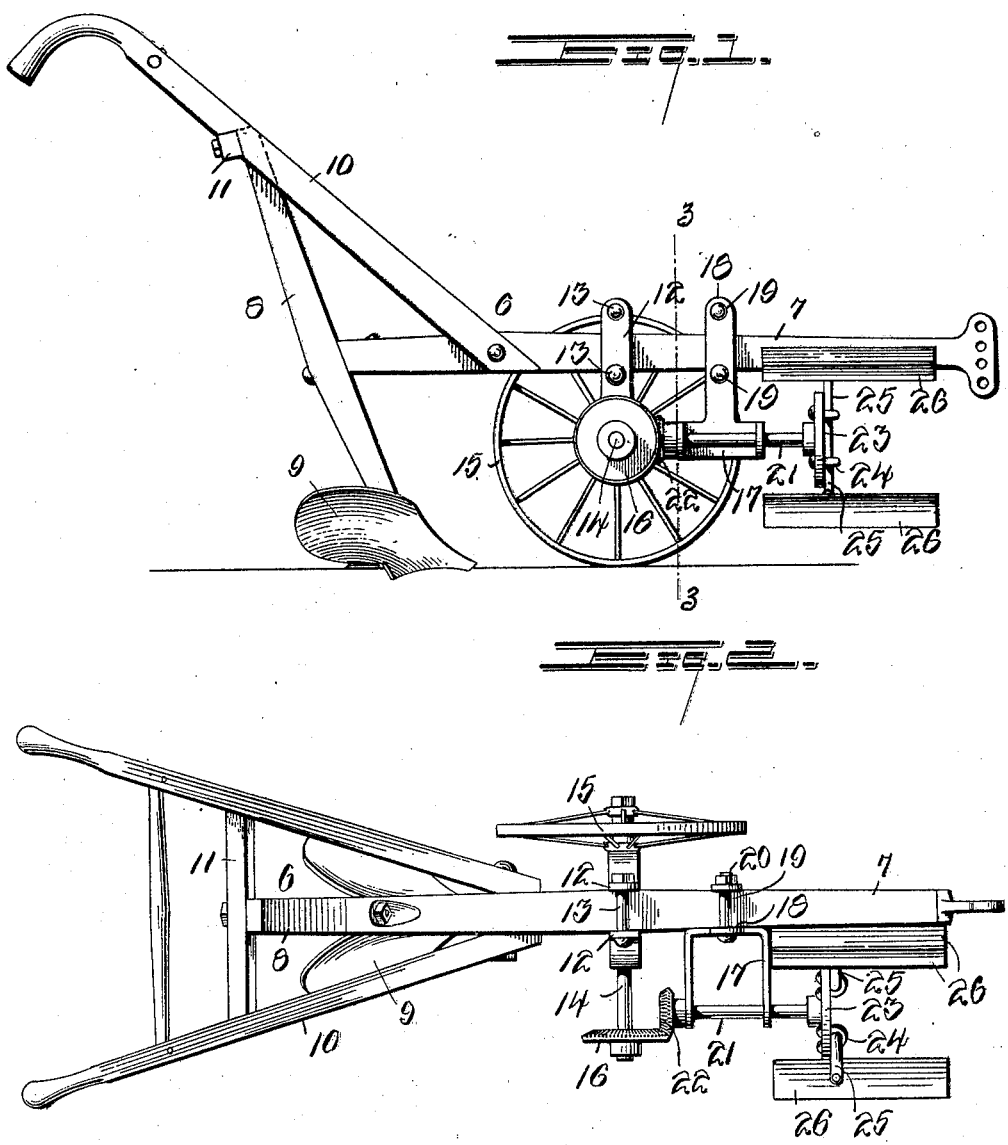

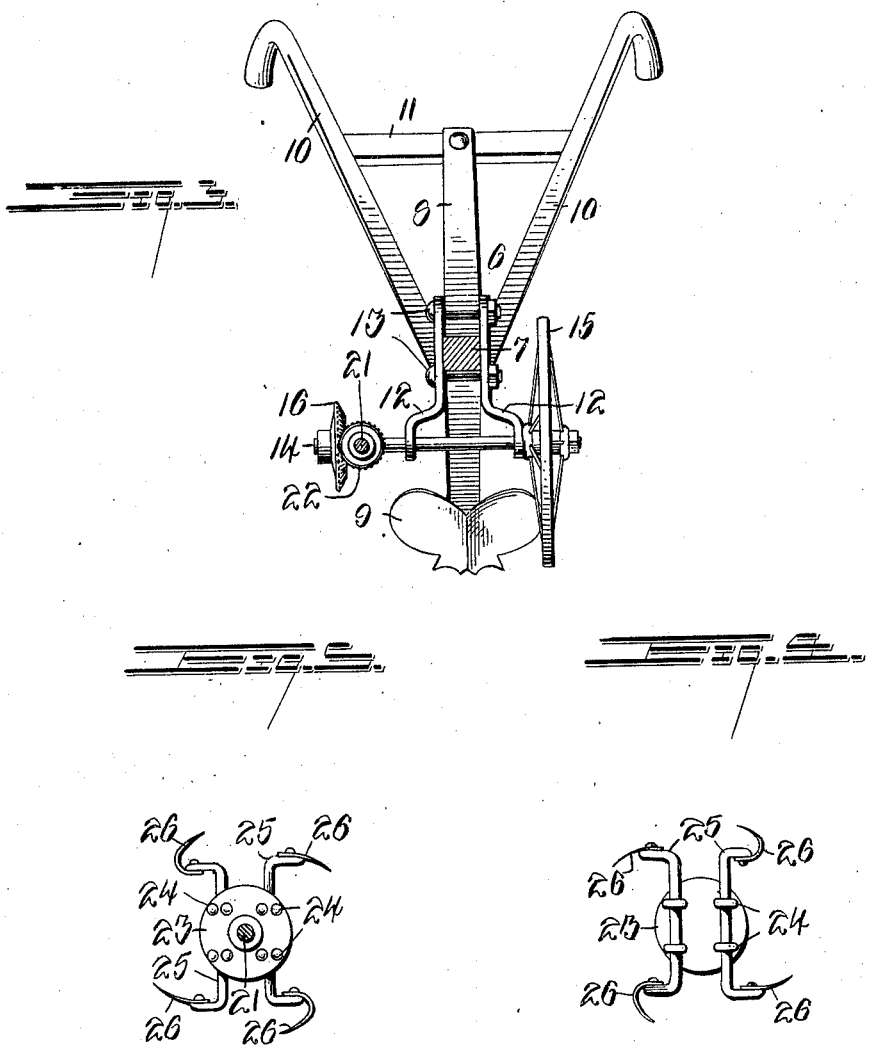

BENJAMIN F. MASON, OF HOT SPRINGS, ARKANSAS, ASSIGNOR OF ONE-FIFTH TO WILLIAM L. BISHOP, OF HOT SPRINGS, ARKANSAS.

COTTON-CHOPPER.

976,817.   Specification of Letters Patent.   Patented Nov. 22, 1910.

Application filed January 18, 1910. Serial No. 538,621.

*To all whom it may concern:*

Be it known that I, BENJAMIN F. MASON, a citizen of the United States, residing at Hot Springs, in the county of Garland, State of Arkansas, have invented certain new and useful Improvements in Cotton-Choppers; and I do hereby declare the following to be a full, clear, and exact description of the invention, such as will enable others skilled in the art to which it appertains to make and use the same.

The invention relates to cotton choppers and more particularly to the class of single row cotton chopper attachments for plows.

The primary object of the invention is the provision of a cotton chopper attachment in which the rotatable chopper blades are disposed in lateral spaced relation to the path of travel of the ground or supporting wheel so that a row of cotton plants may be thinned out and the ground wheel will travel at one side of the row and also the share of the plow will enter the soil and make a furrow along one side of the row of growing plants for the proper cultivation thereof.

Another object of the invention is the provision of a cotton chopper attachment which may be conveniently attached to the beam of an ordinary plow so as to be operated in connection with the latter.

A further object of the invention is the provision of an attachment of this character in which growing plants adjacent to fences may be thinned out so as to leave the plants in bunches or hills as the machine is advanced through a field.

A still further object of the invention is to generally improve this class of devices so as to increase their utility, durability and efficiency.

With these and other objects in view, the invention consists in the construction, combination, and arrangement of parts, as will be hereinafter more fully described in detail, illustrated in the accompanying drawings, which disclose the preferred form of embodiment of the invention, to enable those skilled in the art, to practice the invention, and as pointed out in the claim hereunto appended.

In the drawings:—Figure 1 is a side elevation of a plow with the invention applied thereto. Fig. 2 is a top plan view thereof. Fig. 3 is a sectional view on the line 3—3 of Fig. 1. Fig. 4 is an end elevation of the chopper blade supporting plate or disk with the blades attached thereto. Fig. 5 is a rear elevation.

Similar reference characters indicate corresponding parts throughout the several views in the drawings.

Referring to the drawings by numerals, 6 designates generally a plow which is of the ordinary well known construction comprising a main beam 7, to the rear end of which is fixed a forwardly inclined standard 8, carrying at its lower end a plow blade or share 9, and to the main beam 7, are connected upwardly diverging handle bars 10, the same being also connected by a cross rung 11, to the upper ends of the standard 8, so as to maintain the said handle bars rigid.

The cotton chopper attachment comprises hangers 12, correspondingly shaped to each other and disposed against opposite sides of the plow beam 7, and detachably secured thereto by bolt members 13, connecting the hangers 12, above and below the plow beam. These hangers have journaled in their lower ends an axle 14, to one end of which is fixed a ground or supporting wheel 15, while its opposite end has fixed thereto a beveled gear 16, through the medium of which motion is transmitted to the chopper blades as will be hereinafter more fully described.

Detachably connected to the plow beam 7, a slight distance in advance of the hangers 12, is a laterally projecting U-shaped bracket 17, having rising centrally from its cross connecting piece an extension 18, through which are passed bolt members 19, disposed above and below the plow beam 7, and also through a strap plate 20, so that in this manner the bracket is securely fastened to the plow beam. Journaled in the brackets 17, at right angles to the axle 14, is a driven shaft 21, to the rear end of which is fixed a beveled pinion 22, the latter meshing with the beveled gear 16, on the axle 14, and to the forward end of this shaft 21, is fixed a disk 23, to the front face of which are securely fixed by detachable staples 24, substantially U-shaped laterally projecting blade supporting arms 25, to the free ends of which are fixed chopper blades 26, actuated through the medium of the driven shaft by the supporting or ground wheel. It is apparent that by the employment of the bracket 18, the chopper blades 26, are disposed a considerable distance to one side of the plow beam 7, and the ground or supporting wheel of the attachment, so that the latter will travel at one side of a row of growing plants.

What is claimed is:—

The combination with a plow having a share, of hangers detachably connected to the plow forwardly of the share, an axle journaled in the hangers transversely of the beam, a ground wheel fixed to one end of the axle, a beveled gear fixed to the other end of the axle, a bracket detachably fixed to the beam in advance of the hangers and extending laterally from said beam, a shaft journaled in the bracket at right angles to the axle and having a pinion at one end meshing with the gear and a chopper fixed to the opposite end of the shaft.

In testimony whereof, I affix my signature, in presence of two witnesses.

BENJAMIN F. MASON.

Witnesses:
 FRANK CONNELLY.
 D. BURGAUER.